US011059519B2

(12) United States Patent
Persson et al.

(10) Patent No.: US 11,059,519 B2
(45) Date of Patent: Jul. 13, 2021

(54) REINFORCEMENT ARRANGEMENT

(71) Applicant: Volvo Car Corporation, Gothenburg (SE)

(72) Inventors: Håkan Persson, Gothenburg (SE); Henrik Ebbinger, Vallda (SE); Fredrik Övgård, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 59 days.

(21) Appl. No.: 16/720,495

(22) Filed: Dec. 19, 2019

(65) Prior Publication Data

US 2020/0231214 A1    Jul. 23, 2020

(30) Foreign Application Priority Data

Jan. 23, 2019  (EP) ..................................... 19153290

(51) Int. Cl.
*B60J 7/00* (2006.01)
*B62D 21/15* (2006.01)
(Continued)

(52) U.S. Cl.
CPC ........... *B62D 21/152* (2013.01); *B62D 21/02* (2013.01); *B62D 25/20* (2013.01)

(58) Field of Classification Search
CPC ....... H01L 2924/00; H01L 2224/83192; B07B 1/46; B07B 1/4618; B07B 1/4645;
(Continued)

(56) References Cited

U.S. PATENT DOCUMENTS 5,002,333 A * 3/1991 Kenmochi ............. B62D 21/10
                                                    296/204
6,296,300 B1 * 10/2001 Sato ..................... B62D 21/152
                                                    296/187.08
(Continued)

FOREIGN PATENT DOCUMENTS

DE    102011010365 A1    8/2012
DE    102014008086 A1    11/2014
(Continued)

OTHER PUBLICATIONS

Jul. 17, 2019 European Search Report issue on International Application No. EP 19153290.

*Primary Examiner* — Kiran B Patel
(74) *Attorney, Agent, or Firm* — Clements Bernard Walker; Christopher L. Bernard

(57) ABSTRACT

A reinforcement arrangement for protecting a vehicle occupant in the event of a frontal collision. The reinforcement arrangement which is configured to be centrally located is attachable to lateral support beams of a frame provides a more weight efficient solution compared to previously used reinforcement arrangement attached to longitudinal beams located in a tunnel structure of the vehicle. The described reinforcement arrangement is further configured to minimize intrusion into the vehicle interior in the event of a frontal collision, and to instead direct forces into the frame via the lateral support beams. Thereby, the force can be directed into the frame and not to sensitive components of the energy source.

16 Claims, 3 Drawing Sheets

(51) Int. Cl.
  *B62D 21/02*  (2006.01)
  *B62D 25/20*  (2006.01)
(58) Field of Classification Search
  CPC ...... B62D 25/20; B62D 21/11; B62D 25/025;
             B29C 65/00; B60C 15/0018
  See application file for complete search history.

(56) References Cited

U.S. PATENT DOCUMENTS

| | | | | |
|---|---|---|---|---|
| 6,460,918 | B1* | 10/2002 | Sato | B62D 21/152 296/193.06 |
| 8,276,980 | B2* | 10/2012 | Boettcher | B62D 25/2027 296/193.07 |
| 8,276,981 | B2* | 10/2012 | Koschinat | B62D 21/02 296/204 |
| 8,668,248 | B2* | 3/2014 | Ishizono | B62D 25/025 296/187.08 |
| 8,960,776 | B2* | 2/2015 | Boettcher | B62D 25/20 296/193.07 |
| 9,096,276 | B2* | 8/2015 | Komiya | B62D 21/155 |
| 9,233,719 | B2* | 1/2016 | Shibata | B62D 29/008 |
| 9,988,100 | B2* | 6/2018 | Kim | B62D 25/082 |
| RE47,286 | E* | 3/2019 | Ohnaka | B62D 25/085 |
| 2004/0200659 | A1* | 10/2004 | Miyasaka | B62D 21/155 180/312 |
| 2008/0231085 | A1* | 9/2008 | Westing | B62D 25/20 296/204 |
| 2010/0078969 | A1* | 4/2010 | Boettcher | B62D 21/02 296/193.09 |
| 2010/0187864 | A1 | 7/2010 | Tsuchida | |
| 2012/0187719 | A1* | 7/2012 | Fujii | B62D 21/152 296/187.09 |
| 2012/0274100 | A1* | 11/2012 | Mildner | B62D 25/2018 296/193.07 |
| 2013/0161981 | A1* | 6/2013 | Mildner | B62D 25/08 296/203.02 |
| 2013/0257103 | A1* | 10/2013 | Mildner | B62D 25/20 296/193.07 |
| 2013/0257105 | A1* | 10/2013 | Mildner | B62D 25/20 296/204 |
| 2013/0277130 | A1* | 10/2013 | Katou | B62D 25/087 180/68.5 |
| 2013/0341969 | A1* | 12/2013 | Fujii | B62D 25/08 296/193.07 |
| 2014/0125030 | A1* | 5/2014 | Hara | B62D 21/11 280/124.134 |
| 2015/0061320 | A1* | 3/2015 | Yabu | B62D 25/082 296/187.1 |
| 2016/0264177 | A1* | 9/2016 | Kawaguchi | B62D 25/20 |
| 2016/0297290 | A1* | 10/2016 | Murata | B60L 58/30 |
| 2016/0368535 | A1* | 12/2016 | Kim | B62D 29/008 |
| 2017/0057547 | A1* | 3/2017 | Taguchi | B62D 21/11 |
| 2017/0166259 | A1* | 6/2017 | Kim | B62D 25/081 |
| 2017/0197658 | A1* | 7/2017 | Dowle | B62D 29/00 |
| 2017/0291643 | A1* | 10/2017 | Sakamoto | B60K 11/04 |
| 2018/0105062 | A1 | 4/2018 | Fees et al. | |
| 2019/0185062 | A1* | 6/2019 | Kato | B62D 25/025 |
| 2019/0210441 | A1* | 7/2019 | Ovg Rd | B62D 21/02 |
| 2020/0047696 | A1* | 2/2020 | Atsumi | B60R 19/34 |
| 2020/0148266 | A1* | 5/2020 | Tomizawa | B62D 25/20 |
| 2020/0307695 | A1* | 10/2020 | Tanaka | B62D 25/088 |
| 2020/0307696 | A1* | 10/2020 | Schmitt | B62D 25/04 |
| 2020/0353985 | A1* | 11/2020 | Zeitouni | B62D 21/155 |
| 2021/0016833 | A1* | 1/2021 | Moss | B62D 21/09 |
| 2021/0016840 | A1* | 1/2021 | Moss | B62D 65/02 |
| 2021/0101641 | A1* | 4/2021 | Kim | B62D 21/11 |

FOREIGN PATENT DOCUMENTS

| | | |
|---|---|---|
| DE | 102014005577 A1 | 10/2015 |
| DE | 102017101561 A1 | 7/2018 |
| FR | 2960506 A1 | 12/2011 |

* cited by examiner

REINFORCEMENT ARRANGEMENT

CROSS-REFERENCE TO RELATED APPLICATION

The present disclosure claims the benefit of priority of co-pending European Patent Application No. 19153290.2, filed on Jan. 23, 2019, and entitled "REINFORCEMENT ARRANGEMENT," the contents of which are incorporated in full by reference herein.

TECHNICAL FIELD

The present invention relates to a reinforcement arrangement for a vehicle body. In particular, the invention relates to a reinforcement arrangement configured to protect a vehicle occupant in the event of a frontal collision, the reinforcement arrangement comprising a framework connectable to a frame of a vehicle body.

BACKGROUND

The development of vehicles comprising alternative energy sources, such as batteries or fuels cells, raises new issues relating to crash safety and the structural integrity of the vehicle body. Traditional vehicles typically comprise a combustion engine and associated mechanical elements such as a drive shaft and exhaust system, and the structures associated with such elements can be utilized to increase the structural stability of the vehicle and thereby the safety of vehicle occupants.

However, in electrical, electrical hybrid vehicles or other vehicles comprising alternative energy sources, the structure of the vehicle body is modified to accommodate the alternative energy source and propulsion system. An electrical or hybrid vehicle may for example comprise a battery instead of a combustion engine and a drive shaft, and with the battery located in the floor portion of the vehicle it may not be suitable to use the same type of mechanical structure as provided by a drive shaft.

Accordingly, there is a need to provide new solutions for providing occupant safety in electrical or hybrid vehicles.

SUMMARY

In view of above-mentioned and other drawbacks of the prior art, it is an object of the present invention to provide an improved reinforcement arrangement for a vehicle for protecting the vehicle occupant in the event of a frontal collision.

According to a first aspect of the invention, there is provided a reinforcement arrangement configured to be centrally arranged in a vehicle body. The reinforcement arrangement is further configured to protect a vehicle occupant in the event of a frontal collision. The reinforcement arrangement comprising: a reinforcement framework in a first end connectable to a portion of the vehicle body defining a front wall of a passenger compartment and in a second end connectable to a first lateral support beam of the frame; and a support element in a first end connected to the reinforcement framework at a location between a rear portion and a forward portion of the reinforcement framework and connectable and in a second end connectable to a second lateral support beam of the frame arranged in front of the first lateral support beam.

In the present description, features of the reinforcement arrangement will be described with reference to the geometry of the vehicle, where a longitudinal orientation is an orientation along the length of the vehicle and a lateral orientation is an orientation along the width of the vehicle. Furthermore, the front wall of the passenger compartment is defined as the wall facing the front of the vehicle.

Moreover, that the frame is arranged in a floor portion of the vehicle body means that the frame is located underneath the vehicle passenger compartment. The frame is configured to hold an alternative energy source of the vehicle, i.e. an energy source which is not related to a combustion engine. The energy source located in the frame may for example be one or more battery packs, fuel cells or any other suitable energy source.

The reinforcement arrangement is described as being centrally arranged, meaning that the reinforcement arrangement is located in the center of vehicle, at an equal distance from both sides of the vehicle, in order to be located in a position to absorb forces resulting from a frontal impact of the vehicle. Accordingly, the reinforcement arrangement is located in the center of the vehicle as seen along a lateral direction.

The present invention is based on the realization that a centrally located reinforcement arrangement being attached to lateral support beams of a frame provides a more weight efficient solution compared to previously used longitudinal beams located in a tunnel structure of the vehicle. The described reinforcement arrangement is configured to minimize intrusion into the vehicle interior in the event of a frontal collision, and to instead direct forces into the frame via the lateral support beams. Thereby, the force can be directed into the frame and not to sensitive components of the energy source.

According to one embodiment of the invention, the rear portion of the reinforcement framework is angled downwards towards the first lateral support beam in relation to the forward portion of the reinforcement framework. The angle between the rear portion and the forward portion acts to direct a frontal force acting on the reinforcement arrangement along the length of the rear portion and to achieve an upwards directed force at the point where the front and rear portions meet.

According to one embodiment of the invention, the support element is connected to a central location of the reinforcement framework. The support element may for example be arranged approximately at the middle of the length of the reinforcement arrangement.

According to one embodiment of the invention, the reinforcement framework may consist of two parallelly arranged longitudinal elements. Thereby a strong and at the same time light-weight framework is provided.

According to one embodiment of the invention, the reinforcement framework may further comprise a forward lateral element connecting the two parallelly arranged longitudinal elements.

According to one embodiment of the invention, the reinforcement framework may further comprise a rear lateral element connecting the two parallelly arranged longitudinal elements.

According to one embodiment of the invention, the reinforcement framework may further comprise a central lateral element connecting the two parallelly arranged longitudinal elements at a location where the support element is connected to the reinforcement framework.

According to one embodiment of the invention, the support element may comprise one support leg for each of the two parallelly arranged longitudinal elements. The support elements may for example be substantially vertically arranged between the reinforcement framework and a second lateral support beam of the frame.

According to one embodiment of the invention, the reinforcement arrangement may further comprise a deformable portion arranged between the first end of the reinforcement framework and the vehicle body, the deformable portion being configured to deform in the event of a frontal collision of the vehicle. It is advantageous to have a deformation zone at the front of the vehicle passenger compartment in order to protect passengers in the event of a frontal collision.

According to one embodiment of the invention, the deformable portion is configured to deform elastically during an initial impact stage and to deform plastically during a second impact stage. Here, transition between the initial impact stage and the later second impact stage can be defined by the transition from elastic deformation to plastic deformation.

According to one embodiment of the invention, the deformable portion is configured to deform elastically during an initial impact stage and to deform plastically during a second impact stage if a frontal force acting on the reinforcement arrangement exceeds a force threshold value. Thereby, if the frontal force on the reinforcement arrangement does not exceed the force threshold value, the load is elastically absorbed by the deformable portion of the reinforcement framework. Accordingly, for loads where a frontal force is below the force threshold value, the reinforcement arrangement is not permanently deformed and it is thus able to return to its original shape.

According to one embodiment of the invention, the first lateral support beam of the frame is located at position corresponding to a front portion of a front seat of the vehicle. This brings the advantage that a flat floor design of the vehicle can be employed, where the floor is flat behind the second lateral support beam of the frame. In particular, since the described reinforcement arrangement removes the need for a tunnel console and longitudinal support beams, the flat floor design can be used to increase the leg space for vehicle occupants and also provides additional space between the front seats.

According to one embodiment of the invention, the second lateral support beam of the frame is the forwardmost lateral support beam of the frame. If it is assumed that the frame extends to a front portion of the passenger compartment of the vehicle body, the reinforcement arrangement can be located at the forwardmost portion of the passenger compartment and thereby minimizing the volume which the reinforcement arrangement takes up in the passenger compartment.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DESCRIPTION OF EMBODIMENTS

Figure 1:
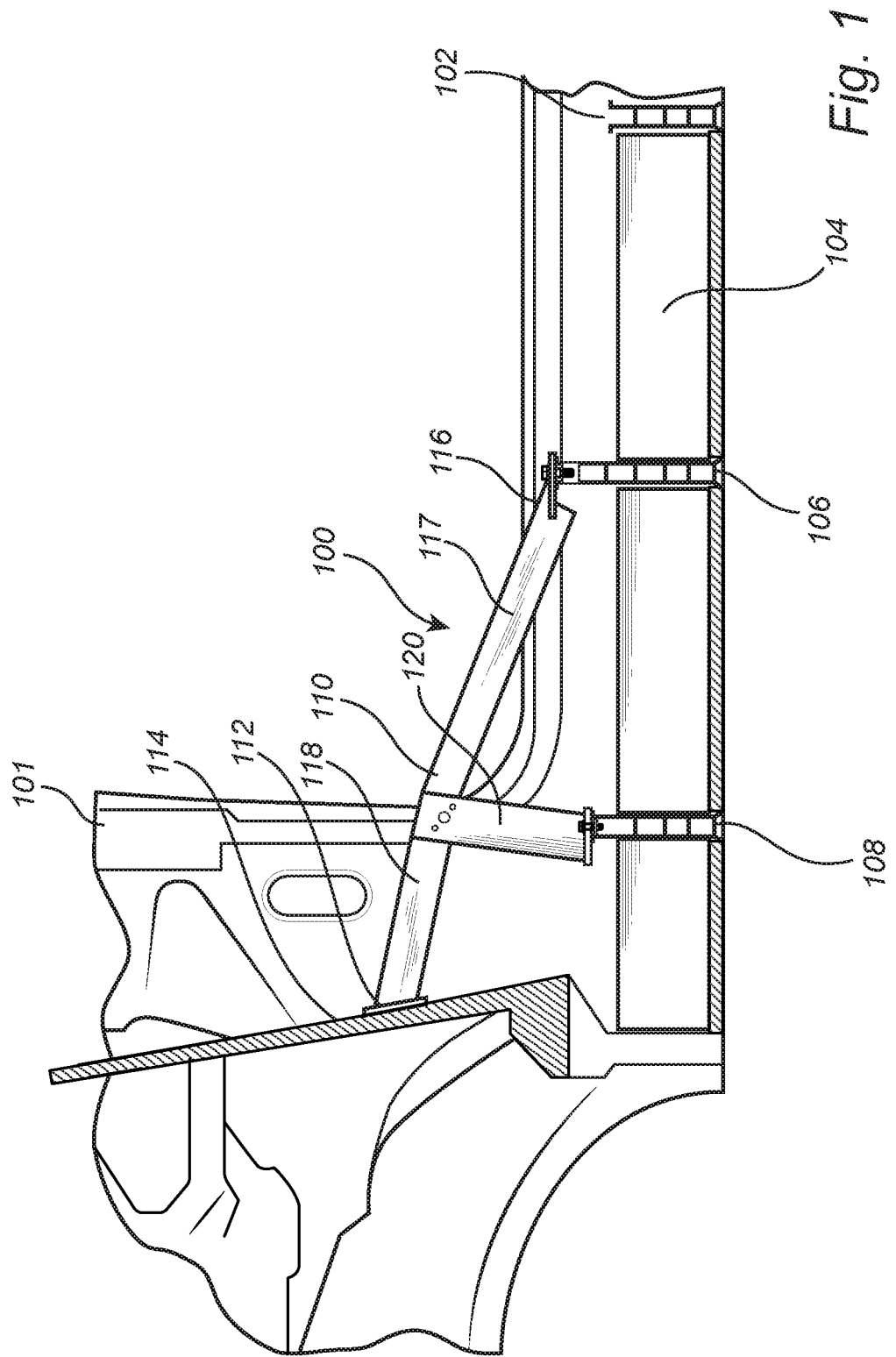
FIG. 1 schematically illustrates a reinforcement arrangement according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 schematically illustrates a side view of a reinforcement arrangement 100 of a vehicle body 101 for protecting a vehicle occupant in the event of a frontal collision. In particular, the reinforcement arrangement 100 is configured to prevent or reduce intrusion into the passenger compartment in the event of a frontal collision.

The reinforcement arrangement 100 is attached to a frame 102 arranged in a floor portion of the vehicle body 101 and configured to hold an energy source 104, the frame comprising a plurality of lateral support beams 106, 108 spaced apart such that an energy source 104 can be located between two adjacent lateral support beams 106, 108. The frame 102 is here illustrated as a battery frame 102 configured to hold a plurality of battery packs 104. The frame 102 may also comprise longitudinal support beams (not shown), preferably arranged at the outer edges of the vehicle body 101 in order to protect the battery pack 104 from side impacts.

The reinforcement arrangement 100 comprises a centrally arranged reinforcement framework 110 in a first end 112 connected to a portion of the vehicle body 101 defining a front wall 114 of a passenger compartment and in a second end 116 connected to a first lateral support beam 106 of the frame. The front wall 114 defines a boundary between the passenger compartment and e.g. an engine or storage compartment located in front of the passenger compartment. Moreover the front wall 114 is here illustrated as being inclined towards the front of the vehicle. However, front wall 114 may equally well be substantially vertical. The reinforcement framework 110 is further described comprising a rear portion 117 and a forward portion 118. The rear and forward portions 117, 118 may be different portions of one framework element, even though it is equally possible to provide the rear and forward portions 117, 118 as separate elements which are joined together to form the reinforcement framework 110.

The illustrated reinforcement arrangement 100 further comprises a support element 120 in a first end connected to the reinforcement framework 110 at a location between the rear portion 117 and the forward portion of the reinforcement framework 110 and in a second end connected to a second lateral support beam 108 of the frame 102 arranged in front of the first lateral support beam 106.

As further illustrated in FIG. 1, the second lateral support beam 108 is arranged in front of the first lateral support beam 106, and the support element 120 is connected to the reinforcement framework 110 at a location between the rear portion 117 and the forward portion 118 of the reinforcement framework 110.

The reinforcement framework 110 is thus described as a longitudinal framework extending from the front wall 114, at a location above the floor level of the vehicle body 101, to the first lateral support beam 106, with a support element 120 connecting a central portion of the reinforcement framework 110 to the second lateral support beam 108. Thereby, the reinforcement framework 110 is inclined upwards from the floor level to the connection to the front wall 114, meaning that the first end 112 of the reinforcement framework 110 is located higher than the second end 116.

Moreover, in an exemplary embodiment illustrated in FIG. 1, there is a difference in angle between the tilt of the rear portion 117 and forward portion 118 of the reinforcement framework 110. This has the effect that a force resulting from a frontal collision acting on the first end 112 of the reinforcement framework 110 will result in an upwards directed force in the support element 120 which in turn will pull on the second lateral support beam 108. That the force in the support element 120 is directed upwards may protect the frame 102 and more importantly the energy source 104 located in the frame 102. It should be noted that the described upward direction of the force in the support element 120 may be achieved also in a reinforcement arrangement 100 where there is no difference in the angle of inclination between the rear and forward portions 117, 118 of the reinforcement framework 110, i.e. when the reinforcement framework 110 is straight.

However, also a reinforcement arrangement 100 where the force in the support element 120 is directed downwards in the event of a forward collision will protect a vehicle occupant by preventing or reducing intrusion into the passenger compartment. Additional variations of the described reinforcement arrangement 100 may be required depending on the precise configuration of the vehicle body 101.

Figure 2:
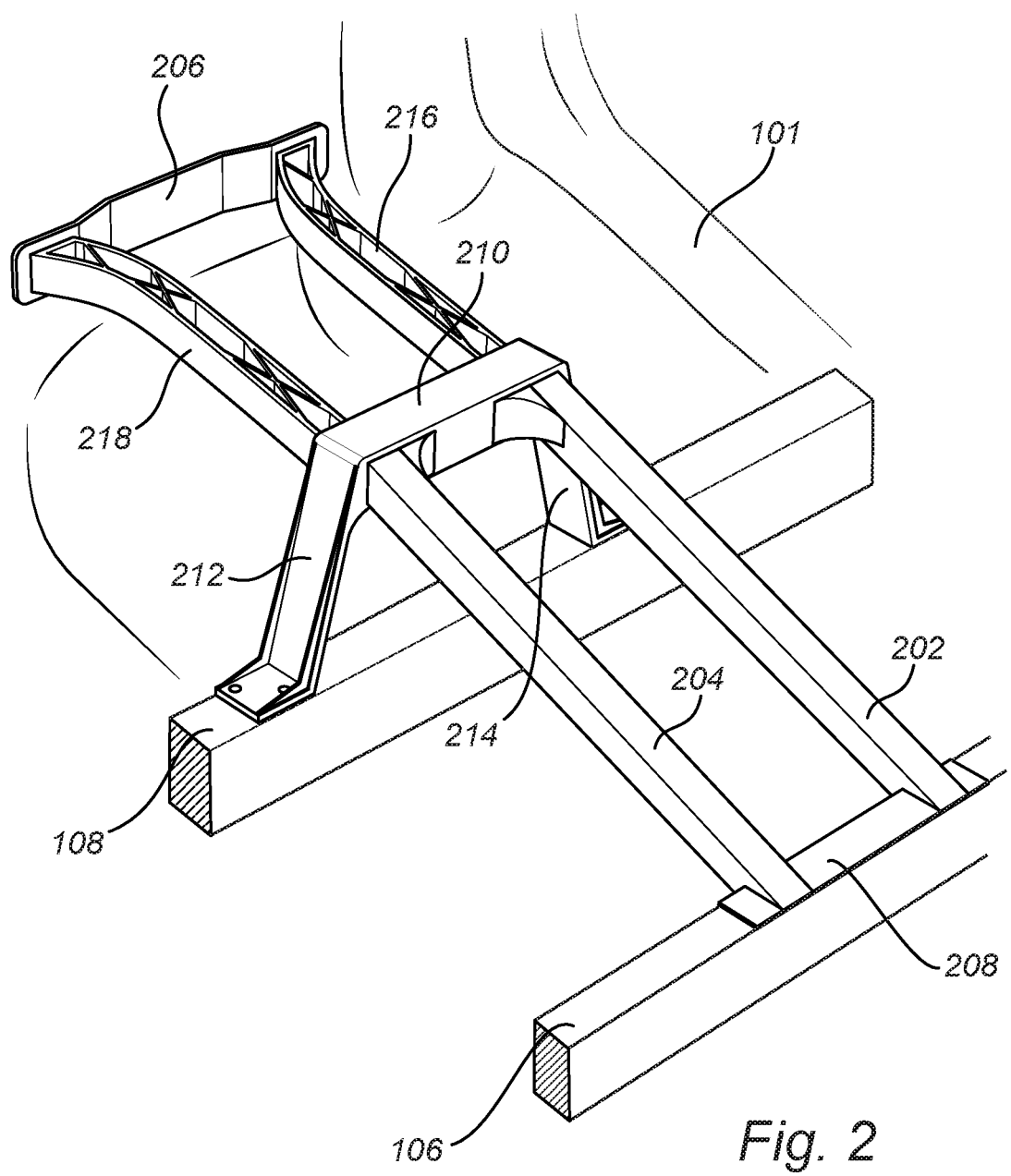
FIG. 2 schematically illustrates a reinforcement arrangement according to an embodiment of the invention.

FIG. 2 schematically illustrates a reinforcement arrangement 100 according to an example embodiment of the invention where the reinforcement framework 110 consists of two parallelly arranged longitudinal elements 202, 204, which are connected together by a forward lateral element 206 located at the first end 112 of the reinforcement framework 110, a rear lateral element 208 located at the second end 116 of the reinforcement framework 110, and by a central lateral element 210 connecting the two parallelly arranged longitudinal elements 202, 204 at a location where the support element 212 is connected to the reinforcement framework 110, which is here approximately at the middle of the length of the reinforcement framework 110.

The forward lateral element 206 increases the strength of the framework 110 and also acts to controllably guide a force resulting from a frontal collision. In particular, the forward lateral element 206 is advantageous when the load is unsymmetrical, in which case the load can be more evenly distributed in the framework 110 by means of the forward lateral element 206. The forward lateral element 206 may also be connected to an existing lateral beam of the vehicle body 101, and it is also possible that the forward lateral element 206 is an existing lateral beam of the vehicle body 101.

The rear lateral element 208 provides stiffness at or near the point where the reinforcement framework 110 is connected to a lateral beam 106 of the frame. A rear lateral element 208 arranged in contact with the lateral beam 106 will also improve the strength of the lateral beam 106, thereby reducing the risk of buckling of the lateral beam 106.

Even though the forward and rear lateral elements 206, 208 are illustrated as being located at the very ends of the reinforcement framework 110, they may equally well be located at some distance from the end points of the reinforcement framework 110.

The support element of FIG. 2 further comprises one support leg 212, 214 for each of the two parallelly arranged longitudinal elements 202, 204. Moreover, each of the longitudinal elements 202, 204 of the reinforcement framework 110 comprises a deformable portion 216, 218 arranged at the first end 112 of the reinforcement framework 110 between the reinforcement framework 110 and the front wall 114, where the deformable portion 216, 218 is configured to deform in the event of a frontal collision of the vehicle. The deformable portion 216, 218 may also be provided in the form of separate elements arranged between the longitudinal elements 202, 204 and the front wall 114 being part of the vehicle body 101. In FIG. 2, the deformable portion 216, 218 is illustrated as a lattice structure configured to achieve the desired deformation properties. However, it is equally possible to use other configurations of the deformable portion 216, 218, such as perforations, ridges, ribs or other types of structural modifications of the framework 110 to achieve the required properties of the deformable portion 216, 218.

Figure 3:
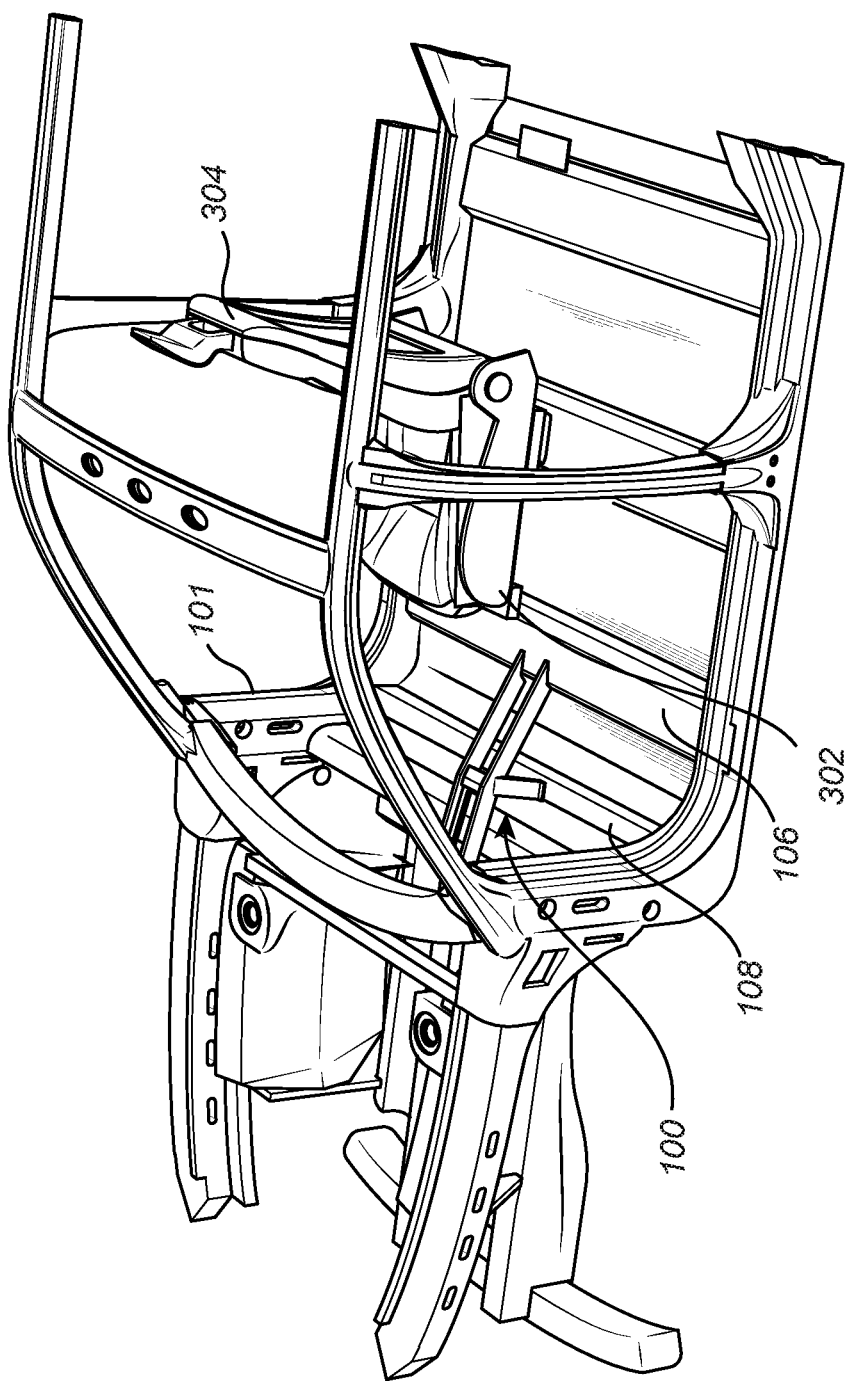
FIG. 3 schematically illustrates a reinforcement arrangement according to an embodiment of the invention.

FIG. 3 illustrates an embodiment of the reinforcement arrangement 100 where the second lateral support beam 108 of the frame 102 is located at a position corresponding to a front portion 302 of a front seat 304 of the vehicle. Thereby, the floor of the passenger compartment can be made flat from the front portion 302 of the front seat 304 and towards the back of the vehicle, e.g. freeing up leg space for rear seat passengers. The second lateral support beam 108 may be the forwardmost lateral support beam of the frame 102. In the present context, the lateral support beams may refer to beams within the frame, or it may be a lateral beam constituting the outer edge of the frame 102. Accordingly, the support element 120 and the rear portion 117 of the reinforcement framework 110 may be connected to any suitable lateral elements of the frame 102.

Even though the invention has been described with reference to specific exemplifying embodiments thereof, many different alterations, modifications and the like will become apparent for those skilled in the art. Also, it should be noted that parts of the reinforcement arrangement may be omitted, interchanged or arranged in various ways, the reinforcement arrangement yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A reinforcement arrangement configured to be centrally arranged in a vehicle body for protecting a vehicle occupant in the event of a frontal collision, the reinforcement arrangement comprising:
   a reinforcement framework in a first end connectable to a portion of the vehicle body defining a front wall of a passenger compartment and in a second end connectable to a first lateral support beam of the frame; and
   a support element in a first end connected to the reinforcement framework at a location between a rear portion and a forward portion of the reinforcement framework and in a second end connectable to a second lateral support beam of the frame arranged in front of the first lateral support beam.

2. The reinforcement arrangement according to claim 1, wherein the rear portion of the reinforcement framework is angled downwards towards the first lateral support beam in relation to the forward portion of the reinforcement framework when arranged in a vehicle.

3. The reinforcement arrangement according to claim 1, wherein the support element is connected to a central location of the reinforcement framework.

4. The reinforcement arrangement according to claim 1, wherein the reinforcement framework consist of two parallelly arranged longitudinal elements.

5. The reinforcement arrangement according to claim 4, wherein the reinforcement framework further comprises a forward lateral element connecting the two parallelly arranged longitudinal elements.

6. The reinforcement arrangement according to claim 4, wherein the reinforcement framework further comprises a rear lateral element connecting the two parallelly arranged longitudinal elements.

7. The reinforcement arrangement according to claim 4, wherein the reinforcement framework further comprises a central lateral element connecting the two parallelly arranged longitudinal elements at a location where the support element is connected to the reinforcement framework.

8. The reinforcement arrangement according to claim 4, wherein the support element comprises one support leg for each of the two parallelly arranged longitudinal elements.

9. The reinforcement arrangement according to claim 1, further comprising a deformable portion arranged at the first end of the reinforcement framework between the reinforcement framework and the vehicle body, the deformable portion being configured to deform in the event of a frontal collision of the vehicle.

10. The reinforcement arrangement according to claim 9, wherein the deformable portion is configured to deform elastically during an initial impact stage and to deform plastically during a second impact stage.

11. The reinforcement arrangement according to claim 10, wherein the deformable portion is configured to deform elastically during an initial impact stage and to deform plastically during a second impact stage if a frontal force acting on the reinforcement arrangement exceeds a force threshold value.

12. The reinforcement arrangement according to claim 1, wherein the support element is substantially vertically aligned.

13. The reinforcement arrangement according to claim 1, further comprising a frame arranged in a floor portion of the vehicle body and configured to hold an energy source, the frame comprising a plurality of lateral support beams spaced apart such that an energy source can be located between two adjacent lateral support beams.

14. The reinforcement arrangement according to claim 13, wherein the second lateral support beam of the frame is the forwardmost lateral support beam of the frame.

15. The reinforcement arrangement according to claim 13, wherein the first lateral support beam of the frame is located at a position corresponding to a front portion of a front seat of the vehicle when arranged in a vehicle.

16. A vehicle comprising a reinforcement arrangement according to claim 1.

* * * * *